SUBSCRIPTION TELEVISION SYSTEMS AND METHOD OF OPERATING THE SAME
Filed Aug. 1, 1957

Inventor
Walter S. Druz
By John J. Pederson
Attorney

United States Patent Office 2,973,406

Patented Feb. 28, 1961

2,973,406

SUBSCRIPTION TELEVISION SYSTEMS AND METHOD OF OPERATING THE SAME

Walter S. Druz, Bensenville, Ill., assignor to Zenith Radio Corporation, a corporation of Delaware Filed Aug. 1, 1957, Ser. No. 675,765

7 Claims. (Cl. 178—5.1)

Figure 1:
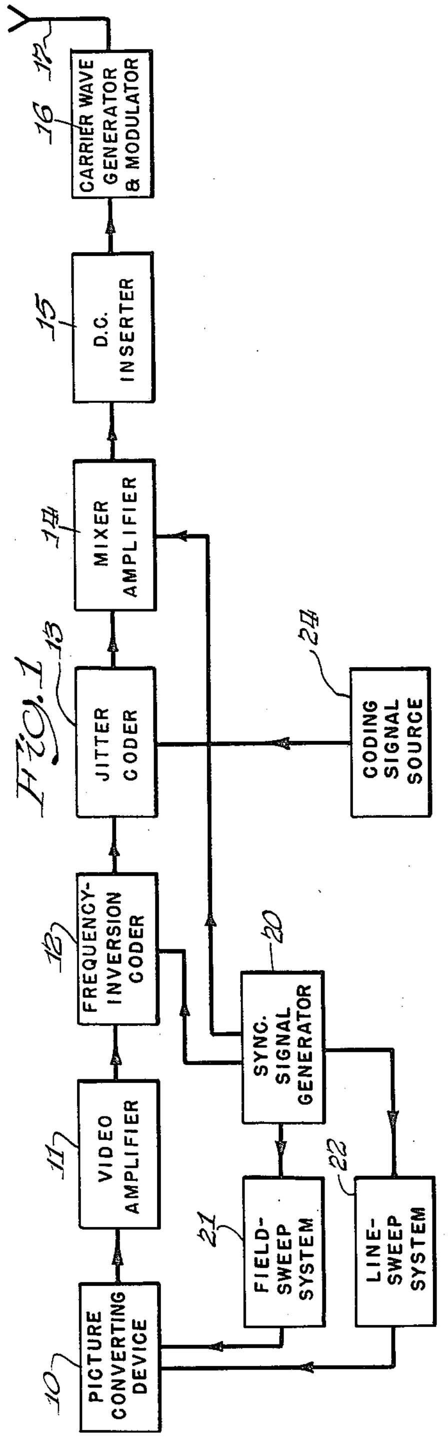

This invention relates to a subscription television system in which a television signal is transmitted in coded form to be utilized only in subscriber receivers containing suitable decoding equipment. Since many of its features are common to both the transmitter and receiver portions of the system, the term "encoding" is used herein in its generic sense to encompass either coding at the transmitter or decoding at the receiver.

In copending application Serial No. 675,764, filed concurrently herewith in the name of Erwin M. Roschke, and assigned to the present assignee, a subscription television system is described wherein extremely complex scrambling or coding of a television signal is achieved by employing two different coding techniques to simultaneously effect two different types of encoding in accordance with two distinctly different code schedules. Briefly, one degree of coding is introduced by phase inverting the video components of the television signal from time to time between two different operating modes in accordance with a secret code schedule so that during some intervals "black" portions of an image are displayed in white on the picture screen at an unauthorized receiver, and vice versa. Moreover, a second degree of coding is introduced wherein portions of the television signal in point of time, for example, the video signals occurring during certain line-trace intervals, are occasionally delayed with respect to other portions, such as the line-synchronizing components immediately preceding those line-trace intervals, to produce a picture display at an unauthorized receiver that horizontally "jitters" back and forth at an eye disturbing rate. Circuit elements are provided to control the two different coding functions in accordance with the two different schedules, including a single adjustable code selector whose instantaneous adjustment determines in part the two different schedules.

While the Roschke system does effect extremely complex mode changing, the additional circuitry required to effect two degrees of encoding results in a corresponding increase in the cost of the receiver equipment over that required to effect only one degree of encoding. The present invention provides an arrangement that achieves at least the same coding complexity as the Roschke arrangement with the added advantage that considerably less circuitry is necessitated.

It is, accordingly, an object of the present invention to provide an improved subscription television system in which a television signal is encoded with a high degree of complexity.

It is another object of the present invention to provide a new and improved subscription television system that accomplishes thorough scrambling or "muss up" of the picture display on the screen of an unauthorized received, but yet requiring a relatively small increase in decoding circuitry at an authorized receiver.

It is another object of the invention to provide a non-commutative encoding arrangement for a subscription television system in which two degrees or operations of coding are introduced in the transmitter in a predetermined order and wherein those operations must be compensated in a receiver in inverse order to achieve successful decoding.

It is a further object of the invention to provide an improved method of operating a subscription television receiver.

It is an additional object of the invention to provide an improved subscription television system in which the picture information is scrambled to a greater extent than in previous systems, and yet this is accomplished by employing a coding technique which by itself has very little security against unauthorized appropriation, without sacrificing any security for the entire system.

It is a more specific object to provide a subscription television receiver for decoding a received coded television signal representing an uncoded television signal upon which has been previously performed two successive and non-commutative coding functions whereby two different characteristics of the uncoded television signal have been coded.

A subscription television receiver, constructed in accordance with the invention, comprises means for developing the above described coded television signal. Decoding apparatus is coupled to the means for subjecting the coded television signal to a decoding function complementary to the second coding function to which the uncoded television signal has been previously subjected in order to produce an intermediate signal with one of the characteristics decoded. Additional decoding apparatus is cascade-couple to the output of the first-mentioned decoding apparatus for subjecting the intermediate signal to a decoding function complementary to the first coding function to which the uncoded television signal has been subjected in order to produce an output signal with both characteristics decoded and this output signal is a simulation of the original uncoded television signal. Finally, the receiver includes means coupled to the additional decoding apparatus for utilizing the output signal.

Figure 2:
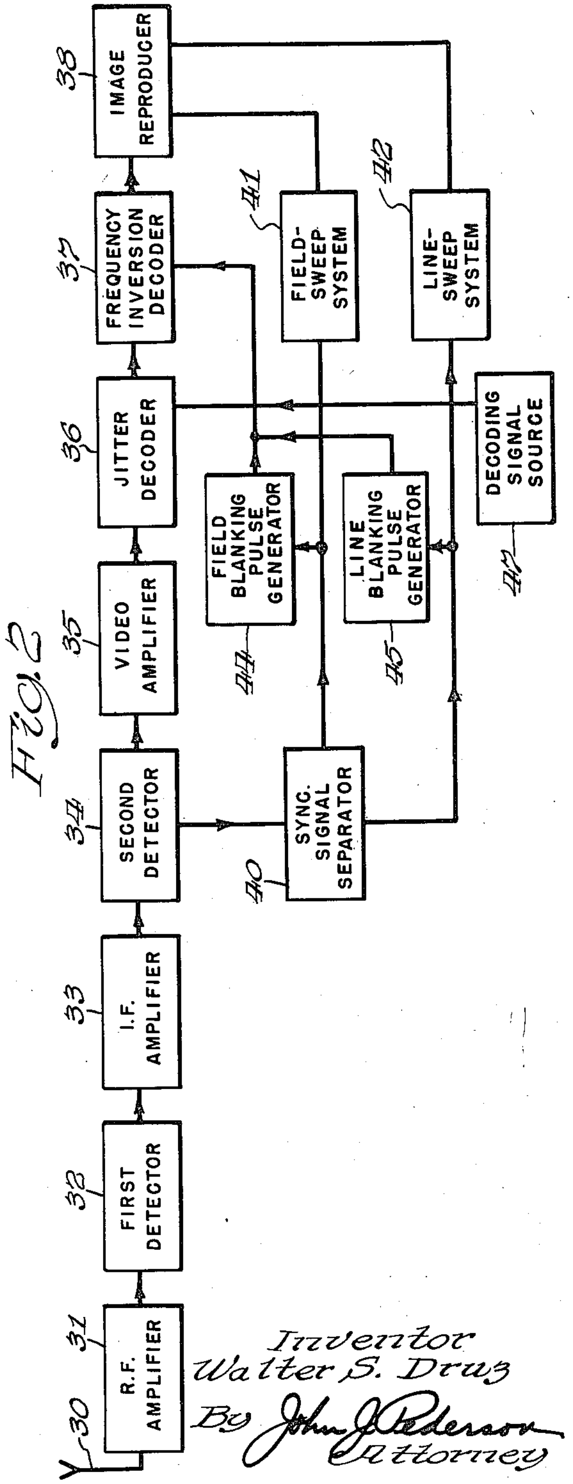

The features of this invention which are believed to be new are set forth with particularity in the appended claims. The invention, together with further objects and advantages thereof, may best be understood, however, by reference to the following description in conjunction with the accompanying drawings, in which:

Figure 1 is a block diagram representation of a subscription television transmitter; and, Figure 2 schematically shows a subscription television receiver which in conjunction with the transmitter of Figure 1 illustrate a system embodying the invention.

Turning now to the structural details of the transmitter of Figure 1, a picture-converting or pick-up device 10, which may be of any well known construction for deriving a video signal representing the image to be televised, is coupled through a video amplifier 11 to a frequency-inversion coder 12. This coder contains heterodyning circuitry which beats or heterodynes either a part or all of the frequency components of an applied video signal to a higher portion of the spectrum and then suppresses the heterodyning signal and the upper side band. Thus, the applied video signal is effectively inverted frequency-wise in coder 12 so that the normally high frequency video components representing fine or sharp picture detail are represented by low frequency video information in the output of coder 12 and, conversely, the ordinarily low frequency information conveying the coarse picture detail information is represented by high frequency video signals. The portion of the frequency spectrum occupied by the inverted video signal may or may not be the same as that occupied by the original video signal depending on the frequency of the heterodyning signal. Such frequency inversion constitutes a coding function since it effectively codes one characteristic of the television signal inasmuch as a normal television receiver would not contain suitable compensating circuitry for re-inverting the signal components. Consequently, the picture display, due to the coding introduced by coder 12 alone, would be thoroughly and completely scrambled. A coder of this type is described in detail in copending application Serial No. 241,081, filed August 9, 1951, and issued August 12, 1958 as Patent 2,847,500, in the name of Walter S. Druz et al., and assigned to the present assignee.

Frequency-inversion coder 12 is cascade-coupled to the input of a jitter coder 13 which may be similar to that disclosed and claimed in Patent 2,758,153, issued August 7, 1956 to Robert Adler, and assigned to the present assignee. It may comprise a beam-deflection tube having a pair of collector anodes connected respectively to a pair of output circuits which may be selectively interposed into the video channel as the electron beam is deflected from one to the other of the two anodes. One of these output circuits includes a delay line so that the timing of the video relative to the synchronizing components of the radiated television signal varies as the beam of the deflection tube is switched between its anodes. This switching effect between the two different operating conditions is accomplished by means of a beam deflection-control or actuating signal applied to jitter coder 13.

Varying the relative timing of the video and synchronizing components from time to time constitutes another coding function in that it effectively codes another characteristic of the television signal by virtue of the fact that conventional television receivers, not containing counterpart video decoding apparatus, require a constant time relation between the video and synchronizing components to effect faithful image reproduction. In other words, if portions of the video information received at an unauthorized receiver are delayed with respect to the periodically recurring line-synchronizing components during spaced intervals and this delay is not compensated during those intervals, the resulting picture display on the picture tube shifts or jitters back and forth.

The frequency inversion and jitter coding functions are of the non-commutative type in that the order of their occurrence has a definite bearing on the manner in which the two degrees of coding must be unscrambled at an authorized receiver. Specifically, the coding functions must be decoded in an order inverse to their occurrence.

The output of jitter coder 13 is coupled to one input of a mixer amplifier 14 which is coupled through a direct-current inserter 15 to a carrier-wave generator and modulator 16 which, in turn, is connected to an antenna 17. The transmitter also includes a synchronizing-signal generator 20 which supplies the usual field- and line-synchronizing and associated pedestal components to mixed amplifier 14 as shown by the connection between those two units. Generator 20 additionally supplies field- and line-drive pulses to a field-sweep system 21 and to a line-sweep system 22, respectively, which are connected to associated deflection elements (not shown) of picture-converting device 10. Generator 20 is also connected to frequency-inversion coder 12 to supply both field- and line-blanking pedestals thereto to render coder 12 inoperative during both vertical- and horizontal-retrace intervals.

A coding signal source 24 is connected to another input of jitter coder 13 to supply a rectangular shaped deflection-control or coding signal thereto in order to effect actuation of that coder between its two operating conditions in accordance with a code schedule represented by the amplitude changes or excursions of the coding signal. The manner in which the coding signal may be developed and information concerning its phase or other significant characteristic may be conveyed to subscriber receivers is entirely immaterial to the present invention. Suitable coding signal sources, for use as unit 24, which develop a phase-modulated rectangular shaped coding signal may be found in the following copending applications: Serial No. 366,727, filed July 8, 1953, and issued September 16, 1958 as Patent 2,852,598, in the name of Erwin M. Roschke; Serial No. 370,174, filed July 24, 1953, and issued October 27, 1959 as Patent No. 2,910,526, in the name of Walter S. Druz; and Serial No. 479,170, filed December 31, 1954, in the name of Erwin M. Roschke, all of which are assigned to the present assignee.

Of course, many of the interconnections between components consist of a plurality of circuits, but for obvious reasons of simplifying the disclosure such interconnections have been illustrated by single conductors only.

Considering now the operation of the transmitter of Figure 1, picture converter 10 produces a video signal representing the image to be televised and this signal, after amplification in video amplifier 11, is translated through cascade-connected coders 12 and 13 to mixer 14 wherein it is combined with the customary periodically recurring field- and line-synchronizing and blanking pulses from synchronizing-signal generator 20 to develop a composite video signal which is supplied to direct-current inserter 15 wherein it is adjusted with respect to proper background level. The adjusted video signal is then amplitude modulated on a picture carrier in unit 16 and the modulated carrier is applied to antenna 17 for transmission to subscriber receivers. Sweep systems 21 and 22 are synchronized by field- and line-drive pulses from generator 20 in conventional manner. The audio portion of the television transmitter has not been shown in order not to encumber the drawings. Of course, if desired, the sound information may also be coded.

Frequency-inversion coder 12 continuously alters the frequency of the video signal components and effectively supplies the video information to jitter coder 13 in scrambled form by virtue of the fact that the video signals are inverted frequency-wise from their original distribution. The vertical- and horizontal-blanking pulses from generator 20 insure that coder 12 is rendered inoperative or "turned off" during the blanking periods in order that coder 12 is made effective only during intervals of video information.

Jitter type coding of the telecast is achieved by coder 13 under the influence of the actuating signal developed by source 24 which switches the beam of the beam-deflection tube in that coder back and forth between its two collector anodes in accordance with the code schedule represented by the amplitude variations of the applied coding signal. This actuation of encoding device 13 varies the operating mode by modifying the time relation between the already frequency inverted video components and the synchronizing components and adds to the picture scrambling or coding. The combination of the frequency inversion type coding effected by encoding device 12 and the jitter type introduced by coder 13 results in a picture display at an unauthorized receiver that is thoroughly scrambled to the point that absolutely no intelligible images may be discerned.

Because of the fact that the frequency inversion and jitter coding functions are non-commutative, the sequence in which they are employed determines the make up of the final radiated coded television signal. In other words, if jitter coder 13 had preceded frequency inversion coder 12, the resulting coded television signal would take a considerably different form. Because of this non-commutative feature of the invention, decoding must proceed in a definite order at the receiver, as will be discussed.

Considering now the construction of the subscription television receiver of Figure 2 which is designed to decode the coded television signal radiated by the transmitter of Figure 1, an antenna 30 is connected to a radio-frequency amplifier 31 which is coupled in turn to a first detector 32 having its output connected to an intermediate-frequency amplifier 33. This amplifier is connected to a second detector 34 having output terminals connected to a video amplifier 35. This amplifier is connected to a jitter decoder 36 which is similar to coder 13 at the transmitter except that it is controlled to operate in a complementary fashion in order to compensate for variations in the timing of the video and synchronizing components of the received television signal. Specifically, when a delay is introduced at the transmitter between a line-synchronizing pulse and the video information occurring during the immediately following line-trace interval, the received video is translated through decoder 36 with no delay. On the other hand, when no delay is introduced at the transmitter between line-synchronizing and video components, a delay is introduced in jitter decoder 36.

The output of decoder 36 is connected through a frequency-inversion decoder 37 to the input electrodes of a cathode-ray image-reproducing device or picture tube 38. Decoder 37 may take a form similar to that of frequency-inversion coder 12 at the transmitter to effectively heterodyne the already frequency inverted video signal and then to suppress the heterodyning frequency component and the upper side band so that the net result is the development of the original uncoded video signal with its various components exhibiting the original unaltered frequencies.

Second detector 34 is also coupled to a synchronizing-signal separator 40 having output circuits connected to a field-sweep system 41 and to a line-sweep system 42 connected in turn to associated deflection elements (not shown) of picture tube 38. Additionally, a field-blanking-pulse generator 44 has its input connected to separator 40 to receive field-drive pulses therefrom and its output connected to another input of frequency-inversion decoder 37. A line-blanking-pulse generator 45 is connected to separator 40 to receive line-synchronizing pulses therefrom and the output circuit of generator 45 is connected in common with the output of generator 44.

A decoding signal source 47, which corresponds to coding signal source 24, is coupled to the deflection electrodes of decoder 36. A rectangular wave decoding signal is thus developed in unit 47 and may be synchronized in phase with relation to the coding rectangular wave at the transmitter in a manner described in any of the aforementioned applications, Serial Nos. 366,727, 370,174, and 479,170.

In the operation of the described receiver, the coded television signal is picked up by antenna 30, amplified in radio-frequency amplifier 31 and demodulated or heterodyned to the selected intermediate frequency in detector 32. The intermediate-frequency signal thereby developed is amplified in amplifier 33 and detected in detector 34 to produce a coded composite video signal. This latter signal is amplified in video amplifier 35, translated through jitter decoder 36 and frequency inversion decoder 37 to the input electrodes of image reproducer 38 to intensity modulate the electron beam in that device in conventional manner. The sweep systems 41 and 42 are, of course, operated in conventional manner.

Decoding at the receiver is accomplished in a manner inverse to that occurring at the transmitter. The composite video signal developed in the output of video amplifier 35 contains the two degrees of coding—an inversion of its various components with respect to frequency and a variation in the time relation of some of the line-trace intervals of video information with respect to the line-synchronizing components. Because of the non-commutative aspect of the previous frequency and time operations on the television signal, it is essential that the operation to which the television signal has last been subjected be compensated first in the receiver. Consequently, the time operation or jitter decoding function must be nullified initially in the receiver and for that reason jitter decoder 36 precedes frequency inversion decoder 37. This order is necessary inasmuch as the jitter coding operation effects a phase shift of some of the video components and thus if frequency reinversion were effected of those phase shifted components before the jitter coding function were compensated, the original frequency distribution would not be obtained. Thus, if it were attempted to decode the constant frequency inversion function first, successful decoding would not be achieved.

Decoder 36 operates in response to the control or actuating signal developed in source 47 and since this signal has the same wave shape as that developed in source 24 at the transmitter, the delays introduced in the video signal at the transmitter are compensated. Hence, the composite video signal of the received telecast is decoded as to the jitter type of coding before it is applied to frequency inversion-decoder 37.

Unit 37 consequently receives essentially the same form of signal as was developed at the output of frequency-inversion coder 12 and thus by subjecting it to another frequency inversion the final signal applied to image reproducer 38 will be identical to that applied to frequency inversion coder 12, namely the original uncoded television signal. Blanking-pulse generators 44 and 45 respond to field- and line-synchronizing pulses respectively to produce blanking pulses for turning decoder 37 off during the retrace intervals. Decoder 37 is thus rendered inoperative during substantially the same intervals that coder 12 is turned off. As mentioned previously, this expedient restricts the operation of the frequency inversion encoding function to the intervals of video information only. Thus, decoding has been effected for both types of coding to provide an intelligible signal for picture tube 38 for successful or faithful image reproduction.

By way of summary, the transmitter of Figure 1 subjects an uncoded television signal (namely, the signal developed in the output of video amplifier 11) to successive and non-commutative first and second coding functions (frequency inversion coding and jitter coding) in the order named whereby two different characteristics of the uncoded television signal are coded to form a coded television signal. Specifically, coder 12 alters the frequency of each individual signal component constituting the uncoded television signal and coder 13 varies the time relationship between the frequency altered video components and the sync pulses.

The receiver of Figure 2 comprises means (circuits 30—35) for developing the coded television signal produced by the transmitter of Figure 1. Decoding apparatus, namely, jitter decoder 36 and decoding signal source 47, is coupled to the last-mentioned means and subjects the coded television signal to a decoding function (namely, to compensate the time relationship changes between video and sync) complementary to the second coding function introduced at the transmitter in order to produce an intermediate signal with one of the two coded characteristics decoded. Frequency-inversion decoder 37 constitutes additional decoding apparatus cascade-coupled to the output of the first-mentioned decoding apparatus for subjecting the intermediate signal to a decoding function (frequency inversion) complementary to the first coding function to produce an output signal with the other as well as the one characteristic decoded and this output signal is a simulation of the original uncoded television signal developed in the output of video amplifier 11 in the transmitter. Image reproducer 38 may be considered means coupled to the additional decoding apparatus for utilizing the output signal.

This invention provides, therefore, a subscription television system that achieves greatly enhanced coding by employing two non-commutative coding functions, one of which exhibits relatively little security by itself. By utilizing a constant operation, which per se does not exhibit a high degree of immunization against unauthorized pirating as is the case with a continuous frequency inversion operation, before the introduction of a highly secret degree of coding (such as jitter coding controlled in accordance with a secret code schedule and which is non-commutative with the frequency inversion operation), the constant coding operation cannot be nullified or compensated until the more secure coding degree is unscrambled. Thus, additional picture "muss up" is obtained with a relatively small increase in circuitry.

While a particular embodiment of the invention has been shown and described, modifications may be made, and it is intended in the appended claims to cover all such modifications as may fall within the true spirit and scope of the invention.

I claim:

1. A subscription television receiver for decoding a received coded television signal representing an uncoded television signal which has been previously subjected to successive and non-commutative first and second coding functions in the order named whereby two different characteristics of said uncoded television signal have been coded, said receiver comprising: means for developing said coded television signal; decoding apparatus coupled to said means for subjecting said coded television signal to a decoding function complementary to said second coding function to produce an intermediate signal with one of said characteristics decoded; additional decoding apparatus cascade-coupled to the output of said first-mentioned decoding apparatus for subjecting said intermediate signal to a decoding function complementary to said first coding function to produce an output signal with the other as well as said one characteristic decoded and which is a simulation of said uncoded television signal; and means coupled to said additional decoding apparatus for utilizing said output signal.

2. A subscription television receiver for decoding a received coded television signal representing an uncoded television signal which has been previously subjected to a first coding function whereby a first characteristic of said uncoded television signal has been coded and also to a subsequent coding function non-commutative with said first coding function whereby a second characteristic of said uncoded television signal has been coded in accordance with a predetermined secret code schedule, said receiver comprising: means for developing said coded television signal; decoding apparatus coupled to said means for subjecting said coded television signal to a decoding function complementary to said second coding function and operated in accordance with said same secret code schedule to produce an intermediate signal with said second characteristic decoded; additional decoding apparatus cascade-coupled to the output of said first-mentioned decoding apparatus for subjecting said intermediate signal to a decoding function complementary to said first coding function to produce an output signal with said first as well as said second characteristic decoded and which is a simulation of said uncoded television signal; and means coupled to said additional decoding apparatus for utilizing said output signal.

3. A subscription television receiver for decoding a received coded television signal representing an uncoded television signal which has been previously subjected to a first coding function whereby a first characteristic of said uncoded television signal has been continuously altered to provide one degree of coding and also to a subsequent coding function non-commutative with said first coding function whereby a second characteristic of said uncoded television signal has been changed from time to time in accordance with a secret code schedule to provide another degree of coding, said receiver comprising: means for developing said coded television signal; decoding apparatus coupled to said means for subjecting said coded television signal to a decoding function complementary to said second coding function and operated in accordance with said same secret code schedule whereby said other degree of coding is effectively compensated to produce an intermediate signal with said second characteristic decoded; additional decoding apparatus cascade-coupled to the output of said first-mentioned decoding apparatus for subjecting said intermediate signal to a decoding function complementary to said first coding function whereby said one degree of coding is effectively compensated to produce an output signal with said first as well as said second characteristic decoded and which is a simulation of said uncoded television signal; and means coupled to said additional decoding apparatus for utilizing said output signal.

4. A subscription television receiver for decoding a received coded television signal representing an uncoded television signal including synchronizing and video components exhibiting predetermined frequencies which uncoded television signal has been previously subjected to an initial first coding function whereby at least some of the video components of said uncoded television signal have been inverted frequency-wise to provide frequency-inversion coding and also to a subsequent jitter coding function non-commutative with said first coding function whereby the time relationship between said synchronizing and video components has been changed from time to time in accordance with a secret code schedule to provide jitter type coding, said receiver comprising: means for developing said coded television signal; decoding apparatus including a jitter decoder coupled to said means for subjecting said coded television signal to a jitter type decoding function operated in accordance with said same secret coding schedule to produce an intermediate signal wherein the variations in the time relationship between said synchronizing and video components are effectively compensated; additional decoding apparatus including a frequency-inversion decoder cascade-coupled to the output of said first-mentioned decoding apparatus for subjecting said intermediate signal to a frequency inversion decoding function to produce an output signal with the previously mentioned frequency-inverted video components of said uncoded television signal reinverted frequency-wise effectively to provide a simulation of said uncoded television signal; and means coupled to said additional decoding apparatus for utilizing said output signal.

5. A subscription television transmitter comprising: means for developing an uncoded television signal; coding apparatus coupled to said means for subjecting said uncoded television signal to a first coding function to produce a partially coded television signal having one characteristic thereof coded; another coding apparatus cascade-coupled to the output of said first-mentioned decoding apparatus for subjecting the partially coded television signal to a second coding function non-commutative with said first coding function to produce a coded television signal having another as well as said one characteristic thereof coded; and means coupled to said other coding apparatus for transmitting said coded television signal to a subscriber receiver.

6. In a combination subscription television transmitter-receiver system, said transmitter comprising: means for developing an uncoded television signal; coding apparatus coupled to said means for subjecting said uncoded television signal to a first coding function to produce a partially coded television signal having a first characteristic thereof coded; another coding apparatus cascade-coupled to the output of said first-mentioned coding apparatus for subjecting the partially coded television signal to a second coding function non-commutative with said first coding function to produce a coded television signal having a second as well as said first characteristic thereof coded; and means coupled to said other coding apparatus for transmitting said coded television signal to said receiver, and said receiver comprising: means for developing said coded television signal; decoding apparatus coupled to said means for subjecting said coded television signal to a decoding function complementary to said second coding function to produce an intermediate signal with said second characteristic decoded; additional decoding apparatus cascade-coupled to the output of said first-mentioned decoding apparatus for subjecting said intermediate signal to a decoding function complementary to said first coding function to produce an output signal with said first as well as said second characteristic decoded and which is a simulation of said uncoded television signal; and means coupled to said additional decoding apparatus for utilizing said output signal.

7. A method of decoding a coded television signal representing an uncoded television signal which has been previously subjected to successive and non-commutative first and second coding functions in the order named whereby two different characteristics of said television signal have been coded, comprising the steps of: subjecting said coded television signal to a decoding function complementary to said second coding function to produce an intermediate signal with one of said characteristics decoded; subjecting said intermediate signal to a decoding function complementary to said first coding function to produce an output signal with the other as well as said one characteristic decoded and which is a simulation of said uncoded television signal; and utilizing said output signal to produce an intelligible image.

References Cited in the file of this patent

UNITED STATES PATENTS

| | | |
|---|---|---|
| 2,758,153 | Adler | Aug. 7, 1956 |
| 2,847,500 | Druz | Aug. 12, 1958 |

OTHER REFERENCES

Comments of Zenith Radio Corp. and TECO, Inc., in the matter of: Amd't. of Part 3 of the Commission's Rules and Regulations (Radio Broadcast Services), to provide for Subscription Television Service, before the F.C.C.; received by the U.S. Patent Office, June 21, 1955.